Patented Nov. 4, 1930

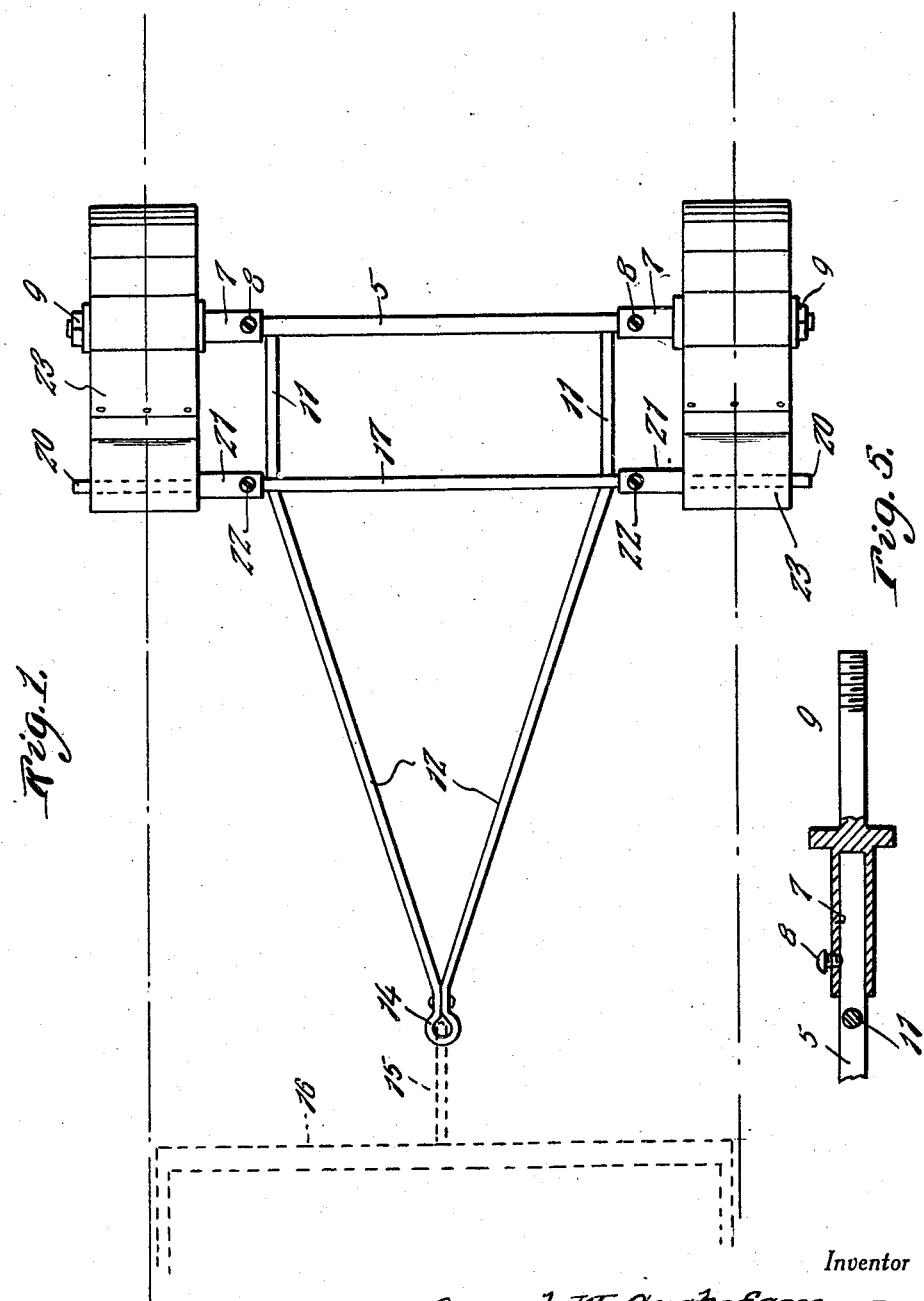

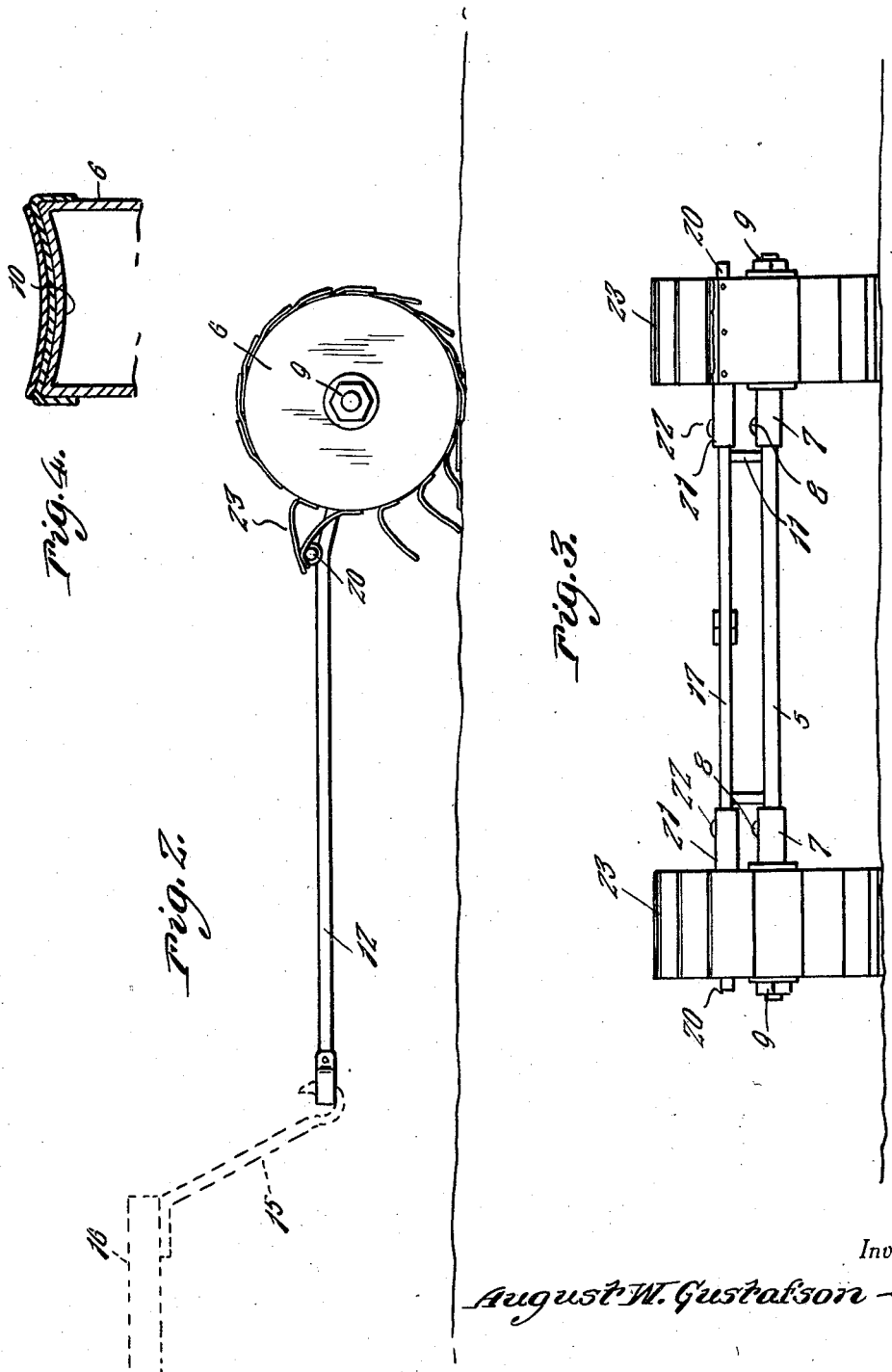

1,780,587

UNITED STATES PATENT OFFICE

AUGUST W. GUSTAFSON, OF HUTTO, TEXAS

PLANTER ATTACHMENT

Application filed June 26, 1929. Serial No. 373,771.

The present invention relates to an attachment for a planter and has for its prime object to provide a device in the form of a trailer for planters in planting cotton, oats, corn etc. with the purpose of pressing the earth over the planted seed so as to make the ground retain its moisture.

Another very important object of the invention resides in the provision of an apparatus of this nature which is exceedingly simple in its construction, inexpensive to manufacture, thoroughly efficient and reliable in use and operation and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:

Figure 1 is a top plan view of the apparatus embodying the features of my invention, Figure 2 is a side elevation thereof, Figure 3 is a rear elevation thereof, Figure 4 is an enlarged detail section taken substantially on the line 4—4 of Figure 2, and Figure 5 is a detail perspective view taken substantially on the line 5—5 of Figure 2.

Referring to the drawing in detail it will be seen that numeral 5 denotes an axle with wheels journaled on the ends thereof being spaced apart by spacing elements 7 held in place by set screws 8 on the axle and, of course on the ends of the axle are nuts 9 for preventing the displacement of the wheels from the axle.

The tread or periphery 10 of each wheel 6 is preferably concaved but may be flat or otherwise shaped if desired.

Radius rods 11 are attached to the axle 5 and extend forwardly at right angles therefrom and merge into forwardly converging extensions 12 which meet together and merge into an eye 14 to be engaged with a suitable hitch 15 at the rear end of the planter 16.

A bar 17 is disposed across the radius rod at the juncture thereof with their extensions and on the end of this bar are arms 20 having portions 21 telescoped over the bar 17 and locked thereto by set screws 22.

On the periphery of each wheel there is fixed a plurality of rubber flaps 23 by riveting or similar means, which as they move forwardly and downwardly are adapted to take the position shown in Figure 2 and flap against the arms 20 so as to more readily engage with the ground and flatten out. These rubber flaps keep the dirt from sticking to the wheel and the striking of these flaps with the arms 20 also prevent dirt from sticking to the flaps.

It is thought that the construction, operation, utility and advantages of this invention will now be quite apparent to those skilled in this art without a more detailed description thereof.

The present embodiment of the invention has been disclosed in considerable detail merely for the purposes of exemplification since in actual practice it attains the features of advantage enumerated as desirable in the statement of the invention and the above description.

It will be apparent that changes in the details of construction, in the materials, in the sizes, in the shape and in the combination and arrangement of parts may be resorted to without departing from the spirit or scope of the invention as hereinafter claimed or sacrificing any of its advantages.

Having thus described my invention, what I claim as new is:

1. An apparatus of the class described comprising a frame, wheels journeled on the frame, flaps secured to the periphery of the wheel, arms on the frame against which the flaps strike as they move downwardly and forwardly, said frame comprising an axle and a pair of radius rods secured thereto.

2. An apparatus of the class described comprising a frame, wheels journaled on the frame, flaps secured to the periphery of the wheel, arms on the frame against which the flaps strike as they move downwardly and forwardly, said frame comprising an axle and a pair of radius rods secured thereto, and projecting forwardly therefrom at right angles and merging into forwardly converging extensions which merge into an eye.

3. An apparatus of the class described comprising a frame, wheels journaled on the frame, flaps secured to the periphery of the wheel, arms on the frame against which the flaps strike as they move downwardly and forwardly, said frame comprising an axle and a pair of radius rods secured thereto, and projecting forwardly therefrom at right angles and merging into forwardly converging extensions which merge into an eye, a bar across the radius rods on which the arms are fastened.

In testimony whereof I affix my signature.

AUGUST W. GUSTAFSON.